M. NEUMANN.
Alcohol Still.
No. 62,670. Patented March 5, 1867.
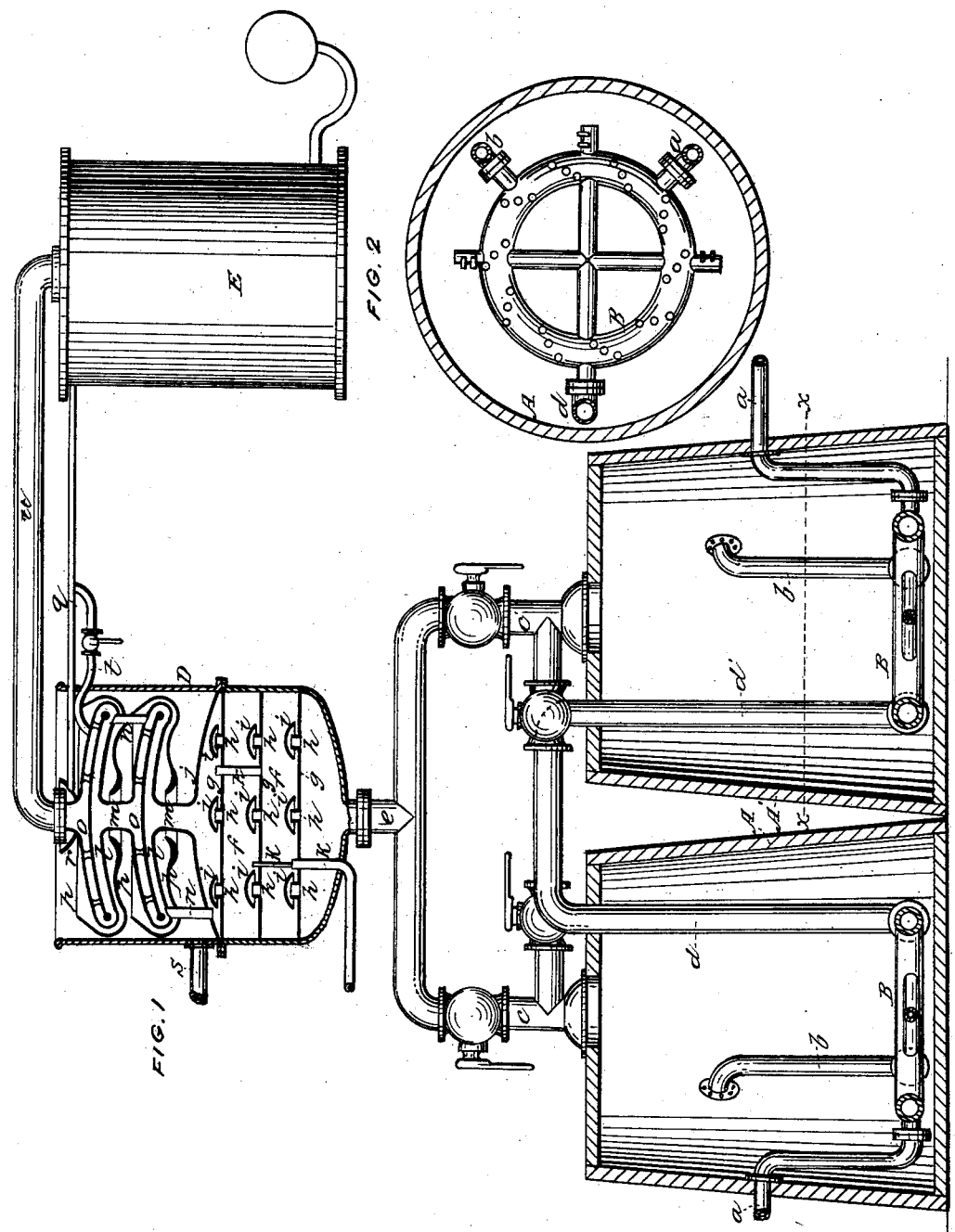

United States Patent Office.

MARCUS NEUMANN, OF NEW YORK, N. Y.

Letters Patent No. 62,670, dated March 5, 1867.

---

IMPROVED APPARATUS FOR DISTILLING AND RECTIFYING SPIRITUOUS LIQUORS.

---

The Schedule referred to in these Letters Patent and making part of the same.

---

TO ALL WHOM IT MAY CONCERN:

Be it known that I, MARCUS NEUMANN, of No. 204, West Twenty-Fifth street, in the city, county, and State of New York, have invented a new and improved Apparatus for Distilling and Rectifying Spirituous and other Liquids; and I do hereby declare that the following is a full, clear, and exact description thereof, which will enable those skilled in the art to make and use the same, reference being had to the accompanying drawing, forming a part of this specification, in which—

Figure 1 represents a vertical section of this invention.

Figure 2 is a horizontal section of a portion thereof, the line $x\ x$, fig. 1, indicating the plane of section.

Similar letters of reference in both views indicate corresponding parts.

This invention relates to an apparatus which is composed of one or more stills, each provided with a steam-heating apparatus, and connected with each other and with a concentrator and condenser in such a manner that the vapors formed in one still can be made to pass through the other still, so as to heat the contents thereof, and the vapors escaping from the stills are made to pass through the concentrator. This concentrator is composed of one or more conical condensing chambers, enclosed in troughs in combination with a water pipe, through which water is thrown on the upper surface of the first condensing chamber, and this water pipe connects with the condenser in such a manner, that the water coming in contact with the condensing chamber or chambers is of the proper temperature to condense the aqueous vapors, passing up from the still or stills, without condensing the spirituous or more volatile vapors; and by these means the spirituous or other liquids are concentrated or rectified.

A A' represent two stills made of wood or any other suitable material, in the usual form or shape. Each of these stills is provided with a steam heater B, which is composed of an annular tube provided with a large number of jets, through which the steam issues, as shown particularly in fig. 2 of the drawing. Said heater is supplied with steam through the pipe $a$, and the waste steam is carried off through the pipe $b$. From the top of each still rises a pipe, $c\ c'$, and the pipe $c$ of the still A connects by a pipe, $d$, with the heater of the still A', and in the same manner the pipe $c'$ of the still A' connects by a pipe $d'$ with the heater of the still A, and the several pipes are provided with stop-cocks, which can be so adjusted that the steam, after having passed through the heater in the still A' and through the mash contained therein, will pass through the heater in the still A and through the mash contained therein, and then up through the discharge pipe $c$, (or *vice versa*,) and by these means the distillation of the mash is effected in an economical way. The pipes $c\ c'$ connect with each other, and the vapors rising through them pass up through the pipe $e'$, into the concentrator D. The lower part of this concentrator is divided into three (more or less) chambers, $f$, by horizontal partitions, $g$, which are perforated with a series of short upright nozzles, $h$, surmounted by caps, $i$. The vapors on rising through the pipe $e$, strike the first partition and pass up through the nozzles therein, and as they strike the caps $i$, a portion of the least volatile parts of the vapors is condensed, and the rest pass up through the nozzles in the second partition, where another portion of the vapors is condensed and so on, until the non-condensed vapors reach the arched partition $j$, which separates the lower from the upper portion of the concentrator. The products of condensation forming in the lower part of the concentrator, pass off through the overflow pipes $k$. The upper part of the concentrator is occupied by one or more condensing chambers, $l$. These chambers are conical, and they connect with each other by central pipes, $m$, through which the vapors rise up, and by small pipes, $n$, through which the products of condensation are carried off. The effect of the condensing chambers may be increased by deflecting plates, $o$, secured in their interior, as clearly shown in fig. 1 of the drawing, and arranged in such a position that the vapors are prevented from passing through said condensing chambers in a direct course. The condensing chambers $l$ are enclosed in troughs, $p$, and they are flooded with water through a pipe, $q$, which extends from the condenser E and discharges into a central cup, $r$. As the water overflows from this cup, it discharges on the top surface of the uppermost condensing chamber, and runs down into the trough surrounding said chamber. From the centre of this trough the water overflows and discharges on the top surface of the second condensing chamber and so on, until it reaches the arched partition $j$, and thence it discharges through the waste pipe $s$. If desired a jet of water may be injected directly upon the deflecting plate of the uppermost condensing chamber through a pipe, $t$, which connects with the water pipe $q$, and which is provided with a stop-cock so that the current of water passing through it can be stopped at will. The pipe $q$ is supplied with water from the condenser E, and thereby its temperature is regulated, so that the aqueous or less volatile vapors mixed with the vapors passing up through the concentrator, are condensed in the condensing chambers, while the spirituous or more volatile vapors pass off through the pipe $u$, to the condensing coil in the condenser E. By these means the aqueous or less volatile vapors are separated automatically from the spirituous or more volatile vapors, and the temperature of the injection water regulates itself, so that in distilling whisky or alcohol the spirit is rectified without much attention and without requiring extra labor, and by the large condensing surface of my chambers, together with their arrangement in the troughs, a perfect condensation of the vapors of any desired density can be effected, while the vapors of less density are allowed to pass off uncondensed.

What I claim as new, and desire to secure by Letters Patent, is—

1. The arrangement of stills A A', with heaters B, and pipes $d\ d'\ c\ c'$, provided with suitable stop-cocks, substantially as and for the purpose described.

2. The condensing chambers $l$, and troughs $p$, in combination with the pipe $q$, condenser E, and still A, constructed and operating substantially as and for the purpose set forth.

3. The extra injection-pipe $t$, in combination with the pipe $q$, chamber $l$, and deflecting plate $o$, in said chamber, substantially as and for the purpose described.

MARCUS NEUMANN.

Witnesses:
W. HAUFF,
CÆSAR NEWMANN.